United States Patent [19]

Lew

[11] Patent Number: 4,972,723
[45] Date of Patent: Nov. 27, 1990

[54] VORTEX GENERATOR-SENSOR

[76] Inventor: Hyok S. Lew, 7890 Oak St., Arvada, Colo. 80005

[21] Appl. No.: 287,159

[22] Filed: Dec. 21, 1988

Related U.S. Application Data

[63] Continuation-in-part of Ser. No. 12,680, Feb. 9, 1987, Pat. No. 4,803,870, Ser. No. 31,902, Mar. 30, 1987, Pat. No. 4,807,481, Ser. No. 105,265, Oct. 7, 1987, Pat. No. 4,879,909, Ser. No. 133,315, Dec. 16, 1987, Pat. No. 4,911,019, and Ser. No. 147,812, Jan. 25, 1988, Pat. No. 4,884,458.

[51] Int. Cl.⁵ .............................................. G01F 1/32
[52] U.S. Cl. ................................................... 73/861.24
[58] Field of Search ......... 73/861.22, 861.24, DIG. 4, 73/861.23

[56] References Cited

U.S. PATENT DOCUMENTS

| | | | |
|---|---|---|---|
| 4,048,854 | 9/1977 | Herzl | 73/861.04 |
| 4,094,194 | 7/1978 | Herzl | 73/861.24 |
| 4,776,222 | 10/1988 | Lew | 73/861.24 |

Primary Examiner—Jerry W. Myracle

[57] ABSTRACT

A vortex flowmeter comprises a vortex generator-sensor including an elongated cylindrical member (1) disposed across a cross section of the flow passage (4) wherein one extremity (2) of the elongated cylindrical member (1) is secured to the wall (3) of the flow passage (4), while the other extremity (7) is connected to a force receiving member (6) extending from a transducer assembly (5) by mechanical coupling (8). The vortices shed from the two opposite lateral sides of the elongated cylindrical member (1) in an alternating mode generate alternating lateral fluid dynamic force on the elongated cylindrical member (1), which in turn generates alternating electrical signal from the transducer. The velocity of the fluid flow is determined from the frequency of the alternating electrical signal and the mass flow rate of the fluid is determined from a combination of the frequency and the amplitude of the alternating electrical signal.

25 Claims, 3 Drawing Sheets

VORTEX GENERATOR-SENSOR

This patent application is a continuation-in-part application to patent applications Ser. No. 012,680 entitled "Vortex Shedding Flowmeter with Mechanically amplifying Pressure Sensor" filed on Feb. 9, 1987, now U.S. Pat. No. 4,803,870; Ser. No. 031,902 entitled "Three-in-one Vortex Shedding Flowmeter" filed on Mar. 30, 1987, now U.S. Pat. No. 4,807,481; Ser. No. 105,265 entitled "Vortex Shedding Flowmeter" filed on Oct. 7, 1987, now U.S. Pat. No. 4,879,909; Ser. No. 133,315 entitled "High Sensitivity-High Resonance Frequency Vortex Shedding Flowmeter" filed on Dec. 16, 1987, now U.S. Pat. No. 4,911,019; and Ser. No. 147,812 entitled "High Sensitivity Vortex Shedding Flowmeter" filed on Jan. 25, 1988, now U.S. Pat. No. 4,884,458.

A vortex flowmeter comprises a vortex generator-sensor of an elongated cylindrical shape with one extremity secured to a rigid boundary of the flow passage and the other extremity connected to a force transmitting member extending from a transducer assembly by a mechanical coupling. The alternating fluid dynamic force experienced by the elongated cylindrical member as a result of the vortices shed therefrom generates alternating electrical signals from the transducer. The velocity of the fluid is determined from the frequency of the alternating fluid dynamic force. The mass flow rate of the fluid is determined from a combination of the frequency and the amplitude of the alternating fluid dynamic force. The mechanical coupling connecting the over-hanging extremity of the vortex generating elongated cylindrical member to the force transmitting member of the transducer greatly enhances the capability to measure the fluid dynamic reaction of the weak vortices shed at a low fluid velocity, as the mechanical coupling very efficiently transmits the fluid dynamic force from the elongated cylindrical member to the transducer while it suppresses the transmission of the mechanical vibrations of small amplitudes. A calibration device exerting a mechanical impulse of known magnitude on the combination of the elongated cylindrical member and the force transmitting member and measuring the electrical pulse from the transducer generated by the mechanical impulse provides the ratio of the amplitude of the mechanical impulse to the amplitudes of the electrical pulse, which ratio is used as a calibration standard in determining the amplitude of the alternating fluid dynamic force from the amplitude of the alternating electrical signal.

The existing versions of the vortex flowmeter comprising a vortex generator-sensor assembled into an integral structure suffer badly from poor sensitivity and, consequently, those existing versions are not capable of measuring low velocity fluid flows. The vortex flowmeter of the present invention using the mechanical coupling connecting the vortex generating elongated cylindrical member to the force transmitting member of the transducer has a greatly improved sensitivity. For example, this new version of the vortex flowmeter employing the mechanical coupling that transmits the reaction of the vortex shedding to the transducer measures air flow velocities as low as 6 feet per second and water flow velocities as low as 0.5 feet per second, while the existing versions are not capable of measuring fluid velocities lower than 30 feet per second in air flow and 2 feet per second in water flow. The vortex flowmeter of the present invention measures the fluid velocity as well as mass flow rate of the fluid, which contrasts with existing versions of the vortex flowmeter capable of measuring the fluid velocity only. Of course, the vortex flowmeter also measures the fluid density, as the ratio of the mass flow rate to the volume flow rate provides the fluid density.

The primary object of the present invention is to provide a vortex flowmeter comprising a vortex generating bluff body with one extremity secured to the rigid boundary of the flow passage and the other extremity connected to a force receiving member extending from a transducer by a mechanical coupling.

Another object is to provide a vortex generator-sensor comprising a vortex generating bluff body that includes a pressure sensing planar member contained within a planar cavity included in the bluff body, wherein the two side walls of the planar cavity respectively include two sets of holes open to the two sides of the bluff body respectively, and the pressure sensing planar member is connected to a force transmitting member of the transducer by a mechanical coupling.

A further object is to provide a vortex generator-sensor comprising a first planar member disposed in a first cavity exposed to the fluctuating fluid dynamic pressure resulting from the vortex shedding and connected to a first transducer, and a second planar member disposed in a second cavity sealed off from the fluid pressure and connected to a second transducer, wherein two electric signals respectively generated by the first and second transducers are combined in such a way that the noise is cancelled out therebetween and a pure signal representing the vortex shedding is obtained.

Yet another object is to provide a vortex flowmeter employing a vortex generator-sensor that determines fluid velocity from the frequency of the alternating fluid dynamic force generated by the vortices shed from the vortex generator-sensor.

Yet a further object is to provide a vortex flowmeter employing a vortex generator-sensor that determines mass flow rate of the fluid from a combination of the frequency and the amplitude of the alternating fluid dynamic force generated by the vortices shed from the vortex generator-sensor.

Still another object is to provide a vortex flowmeter employing a vortex generator-sensor that determines the fluid density from the ratio of the mass flow rate to the volume flow rate.

Still a further object is to provide a vortex generator-sensor with a calibration device imposing a mechanical impulse on the vortex generator-sensor and measuring an electrical pulse generated by the mechanical impulse, which calibration device provides the ratio of the amplitude of the mechanical impulse to the amplitude of the electrical pulse as a calibration standard in determining the amplitude of the alternating fluid dynamic force generated by the vortices from the amplitude of the alternating electrical signals generated by the transducer.

Yet still another object is to provide a vortex generator-sensor employing a Piezo electric transducer providing two electric signals which can be combined to eliminate noise and extract a purified signal representing the alternating fluid dynamic force generated by the vortices.

These and other objects of the present invention will become clear as the description thereof progresses. The present invention may be described with a greater calrity and specificity by referring to the following figures.

Figure 1:
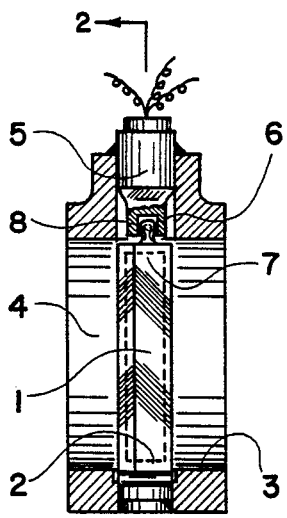
FIG. 1 illustrates a cross section of an embodiment of the vortex flowmeter comprising a vortex generator-sensor.

In FIG. 1 there is illustrated a cross section of an embodiment of the vortex flowmeter comprising a vortex generator-sensor. The vortex generator-sensor comprises a vortex generating bluff body 1 of an elongated cylindrical geometry with one extremity 2 secured to the wall 3 of the flow passage 4 and a transducer 5 including a force transmitting member 6 extending therefrom and connected to the other extremity 7 of the bluff body 1 by a mechanical coupling 8 such as a socket joint, threaded joint, flex joint or weld joint with a reduced solid cross section, etc.

Figure 2:
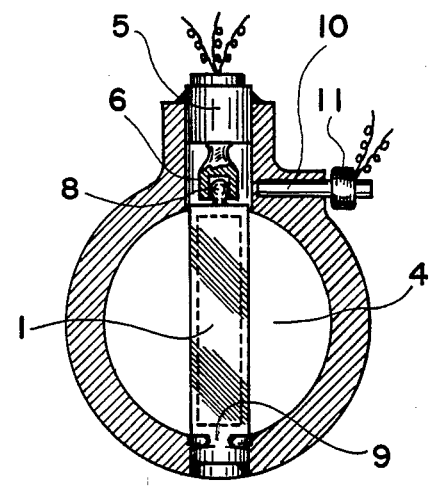
FIG. 2 illustrates another cross section of the embodiment shown in FIG. 1.

In FIG. 2 there is illustrated another cross section of the embodiment shown in FIG. 1, which cross section is taken along plane 2—2 as shown in FIG. 1. The bluff body 1 may include a thin section 9 included at the extremity thereof secured to the flowmeter body in order to enhance the transmission of the fluid dynamic force experienced by the bluff body 1 to the transducer 5. The bluff body 1 may be constructed as a hollow structure to reduce the mass thereof, which helps to keep the resonance frequency of the vortex generator-sensor far above the range of vortex shedding frequencies. The vortex flowmeter may include a calibration device such as the electromagnet with a core rod 10 extending to a close proximity to the force transmitting member 6 made of a ferromagnetic material and the solenoid coil 11. The electromagnet may be disposed at a position where the core rod 10 extends to a close proximity to the bluff body 1 instead of the force transmitter 6, in which case the bluff body 1 is made of a ferromagnetic material.

The vortex flowmeter illustrated in FIGS. 1 and 2 operates on the following principles: The bluff body 1 sheds vortices from the two lateral sides thereof in an alternating pattern, which create alternating fluctuations in the fluid pressure at the two lateral sides of the bluff body 1. As a consequence, the bluff body 1 experiences an alternating lateral force, that is transmitted to the transducer 5 through the force transmitting member 6. The frequency of the alternating fluid dynamic force experienced by the bluff body 1 is linearly proportional to the fluid velocity in a wide range of Reynolds numbers. Consequently, the fluid velocity is determined from the frequency of the alternating electrical signals generated by the transducer 5. In the actual operation of the vortex flowmeter, the relationship between the vortex shedding frequency and the fluid velocity including the non-linear relationship therebetween in low Reynolds number flows should be empirically determined by calibrating the flowmeter and stored in the memory of the data processor which determines the fluid velocity or the volume flow rate from the vortex shedding frequency based on the empirically determined relationship therebetween. The amplitude of the alternating lateral fluid dynamic force resulting from the vortex shedding and experienced by the bluff body 1 is generally a quasi-linear function of the dynamic pressure of the fluid flow which is equal to one half of the fluid density times the square of the fluid velocity. Therefore, the mass flow rate of the fluid can be determined from a combination of the fluid velocity determined from the vortex shedding frequency and the amplitude of the alternating lateral fluid dynamic force experienced by the bluff body 1. The frequency of the alternating electrical signal from the transducer 5 generated by the alternating lateral fluid dynamic force experienced by the bluff body 1 is always equal to the frequency of the vortex shedding. The amplitude of the alternating lateral fluid dynamic force experienced by the bluff body 1 can be determined from the amplitude of the alternating electrical signals from the transducer 5 when the proportionality relationship therebetween is known. The ratio of the amplitude of the alternating fluid dynamic force to the amplitude of the alternating electrical signal may be a constant, or may vary in time due to a change of the fluid temperature or due to aging of the elements included in the vortex generator-sensor. If the amplitude ratio does not change depending on the operating conditions and aging in time, the numerical values of the amplitude ratio can be determined empirically by calibrating the flowmeter and stored in the memory of the data processor that determines the amplitude of the alternating fluid dynamic force from the amplitude of the alternating electrical signal based on the stored values of the amplitude ratio. If the numerical values of the amplitude change as a function of operating conditions and aging in time, it is necessary to include a calibration device that updates the numerical values of the amplitude ratio on an on and off basis or real time basis. The electromagnet including the core 10 and the solenoid coil 11 is an embodiment of such a calibration device. When the solenoid coil 11 is energized by a predetermined amount of electric current, the electromagnet exerts a mechanical impulse of known magnitude on the combination of the bluff body 1 and the force transmitting member 6, which generates an electrical pulse from the transducer 5. The ratio of the amplitude of the mechanical impulse to the amplitude of the electrical pulse provides the amplitude ratio that converts the amplitude of the alternating electrical signal from the transducer 5 to the amplitude of the alternating lateral fluid dynamic force experienced by the bluff body 1. The calibration or updating of the amplitude ratio may be performed on an on and off basis or on a continuous basis and stored in the data processor carrying out altorithms providing the mass flow rate. The electrical pulse generated by the mechanical impulse can be distinguished from the electrical signals generated by the vortex shedding when a mechanical impulse of magnitude significantly greater than the amplitude of the alternating lateral fluid dynamic force is employed, or the mechanical impuse is imposed in a series at a frequency that is separated from the vortex shedding frequencies. The amplitude ratio determined by the calibration device may be stored in the memory of the data processor or directly used by the data processor on a real time basis in determining the amplitude of the alternating lateral fluid dynamic force experienced by the bluff body 1 from the amplitude of the alternating electrical signal generated by the transducer 5.

Figure 3:
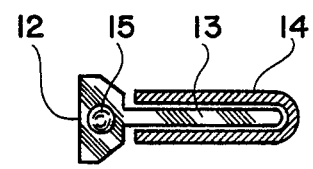
FIG. 3 illustrates a cross section of a vortex generator-sensor of a modified design.

In FIG. 3 there is illustrated a cross section of a combination including a bluff body 12 with an extended planar trailing edge 13 that is enclosed within a pressure shield 14 having a U-shaped cross section, which can be used in place of the simple bluff body 1 that comprises the bluff leading edge portion of the bluff body 12 minus the planar trailing edge 13 and the pressure shield 14. The pressure shield 14 is rigidly secured to the wall of the flow passage at one or both extremities thereof, while the bluff body 12 is secured to the wall of the flow passage at one extremity thereof and connected to the force transmitting member of the transducer by a mechanical coupling such as a socket joint that includes a ball or post 15 engaging a socket included in the extremity of the force transmitting member. The embodiment of the bluff body shown in FIG. 3 amplifies the effect of the fluctuating fluid pressure created by the vortex shedding by means of the enlarged lateral surface areas of the bluff body 12 provided by the extended planar trailing edge 13.

Figure 4:
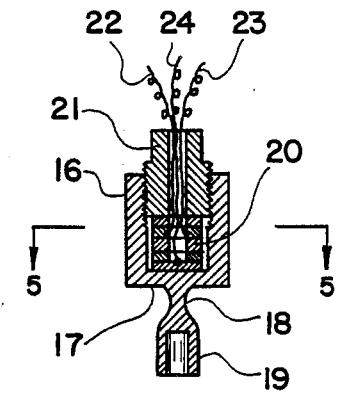
FIG. 4 illustrates a cross section of an embodiment of the transducer employed in the embodiment shown in FIGS. 1 and 2.

In FIG. 4 there is illustrated a cross section of the transducer assembly 5 included in the embodiment shown in FIGS. 1 and 2. The container vessel 16 has a relatively thin end wall 17 reinforced by a rib 18 extending diametrically thereacross in a direction generally parallel to the central axis of the flow passage 4, from which thin end wall the force transmitting member 19 with a mechanical coupling means included in a extremity thereof extends. A Piezo electric element 20 is disposed within the container vessel 16 and pressed onto the thin end wall 17 by a plug 21 threadedly engaging the open end of the container vessel 16. The Piezo electric element 20 is electrically insulated from the container vessel as required by the condition dictated by the function thereof. The conductor wires 22, 23 and 24 routed through an axial hole included in the plug 21 extend from the electrodes included in the Piezo electric element 20.

Figure 5:
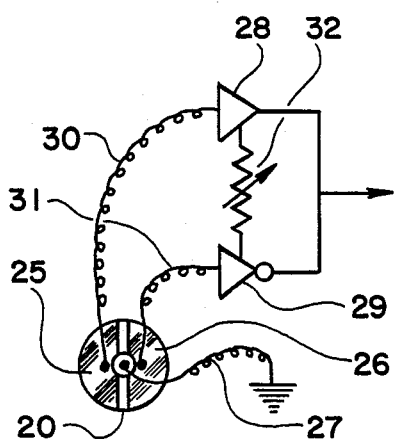
FIG. 5 illustrates an embodiment of the Piezo electric element included in the transducer shown in FIG. 4 and an electronic circuit refining the electric signal therefrom.

In FIG. 5 there is illustrated a view of the Piezo electric element 20 taken across plane 5—5 as shown in FIG. 4, and an embodiment of the electronic circuit refining electrical signals from the Piezo electric element 20. The Piezo electric element 20 of a circular disc shape is polarized in a direction perpendicular to the plane thereof. At lease one side of the Piezo electric element 20 includes two electrodes 25 and 26 disposed opposite to one another about a plane including the reinforcing rib 18 disposed generally parallel to the central axis of the flow passage, while the other side has a single or a pair of electrodes grounded by the wire 27. The two electrodes 25 and 26 are respectively connected to an amplifier 28 and an inverting amplifier 29 by the two wires 30 and 31. The two electrical signals respectively amplified by the two amplifiers 28 and 29 are balanced by means of the variable balancing resistors 32 or other means providing variable gains and combined in such a way that the noises are cancelled out therebetween and a refined output signal representing the vortex shedding is obtained.

Figure 6:
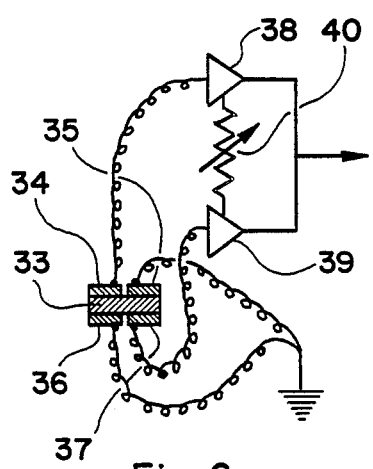
FIG. 6 illustrates another embodiment of the Piezo electric element usable in conjunction with the transducer shown in FIG. 4 and an electronic circuit refining the electric signal therefrom.

In FIG. 6 there is illustrated a cross section of another embodiment of the Piezo electric element usable in place of the element 20 shown in FIG. 4, which cross section is taken along a plane including the reinforcing rib 18, and an embodiment of the electronic circuit refining the electrical signals from the Piezo electric element. The two sides of the Piezo electric element 33 respectively include two pairs of electrodes 34 and 35, and 36 and 37, wherein two electrodes of each pair are disposed opposite to one another about a plane including the rib 18 shown in FIG. 4. The electrodes 34 and 37 are respectively connected to two amplifiers 38 and 39 including balancing means 40 therebetween, while the electrodes 35 and 36 are grounded. This embodiment eliminates the use of the inverting amplifier 29 shown in FIG. 5.

Figure 7:
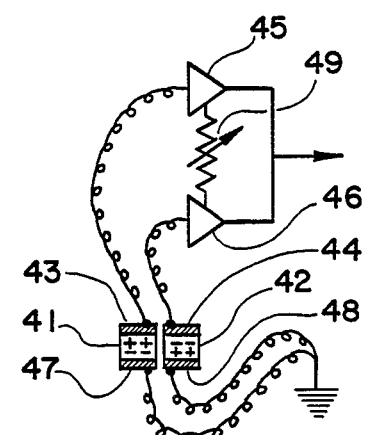
FIG. 7 illustrates a further embodiment of the Piezo electric element usable in conjunction with the transducer shown in FIG. 4 and an electronic circuit refining the electric signal therefrom.

In FIG. 7 there is illustrated a cross section of a further embodiment of the Piezo electric transducer usable in place of the element 20 included in the embodiment shown in FIG. 4, which comprises a pair of semicircular disc Piezo electric elements 41 and 42 disposed opposite to one another about a plane including the rib 18 shown in FIG. 4. The two semicircular disc Piezo electric elements are polarized in two opposite directions. The first pair of electrodes 43 and 44 disposed on the first side of the elements and respectively belonging to the two Piezo electric elements are connected to the two amplifiers 45 and 46 respectively, while the second pair of electrodes 47 and 48 disposed on the second side of the elements and respectively belonging to the two Piezo electric elements are grounded. The electrical signals from the two Piezo electric elements 41 and 42 are added after balancing out the noise between the two amplifiers by means of the signal balancing means 49. This embodiment also eliminates the need for an inverting amplifier such as the element 29 shown in FIG. 5. It should be understood that the vortex meter or the vortex generator-sensor of the present invention may employ transducers other than the Piezo electric transducers, which can be strain gauge or capacitive or inductive transducers, which are well known to the skilled in the art of the flowmeter technology.

Figure 8:
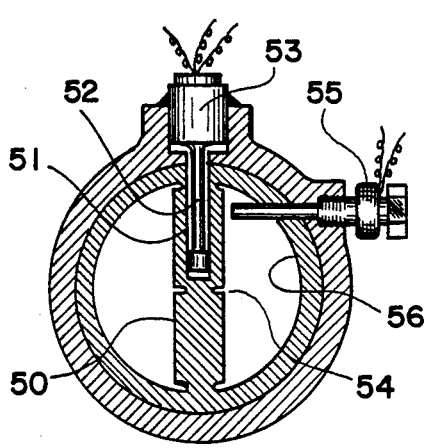
FIG. 8 illustrates a cross section of another embodiment of the vortex flowmeter comprising a vortex generator-sensor.

In FIG. 8 there is illustrated a cross section of another embodiment of the vortex flowmeter comprising a vortex generator-sensor. The bluff body 50 secured to the wall of the flow passage at both extremities thereof includes a blind hole 51 disposed following the length of the bluff body, which hole is engaged by an elongated force transmitting member 52 extending from the transducer 53, wherein the extremity of the elongated force transmitting member 52 is pressure fitted into the hole 51 at a midsection of the bluff body 50. The bluff body 50 may include one or more thin sections 54 included in the midsection or extremities thereof, which enhance the transmission of the fluid dynamic force to the transducer 53. The electromagnet 55 of the calibration device exerts a mechanical impulse of known magnitude on the elongated force transmitting member 52 or on the bluff body 50 when the solenoid coil thereof is energized. This embodiment is particularly suitable for the construction of a vortex flowmeter requiring lining of the wetted surface as the bluff body 50 and lining sleeve 56 can be constructed in a single integral structure with a plastic material.

Figure 9:
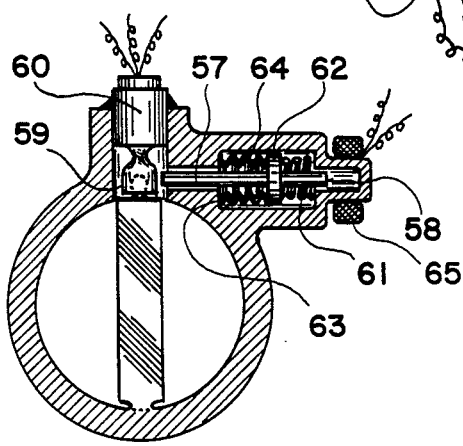
FIG. 9 illustrates a cross section of a further embodiment of the vortex flowmeter comprising a vortex generator-sensor.

In FIG. 9 there is illustrated a further embodiment comprising a vortex generator-sensor of the same construction as the embodiment shown in FIGS. 1 and 2. The calibration device comprises a rod 57 with a ferromagnetic extremity 58, which rod is spring biased towards the force transmitting member 59 of the transducer 60 by a coil spring 61. The flange 62 of the rod 57 is connected to the flowmeter body 63 by an axially flexible coupling 64 such as a bellow coupling. The solenoid coil 65 pulls the rod 57 away from the force transmitting member 59 when the solenoid coil 65 is energized. Upon deenergizing the solenoid coil 65, the rod 57 impacts on the force transmitting member 59 delivering a mechanical impulse of magnitude predetermined by the coil spring 61, which generates an electrical pulse from the transducer 60. The ratio of the amplitude of the mechanical impulse to the amplitude of the electrical pulse provides a calibration standard, by which the amplitude of the alternating fluid dynamic force experienced by the bluff body is determined from the amplitude of the alternating electrical signal from the transducer generated by the vortex shedding.

Figure 10:
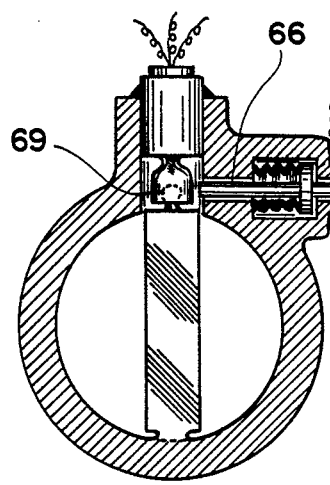
FIG. 10 illustrates a cross section of yet another embodiment of the vortex flowmeter comprising a vortex generator-sensor.

In FIG. 10 there is illustrated a cross section of yet another embodiment of the vortex flowmeter comprising a vortex generator-sensor. The calibration device includes a rod 66 with a ferromagnetic extremity 67, that is disposed in an axially moveable arrangement. When the solenoid coil 68 is energized, the ferromagnetic extremity 67 of the rod 66 is attracted thereto, which action exerts a mechanical impulse having a magnitude pre-determined by the amount of the electric current energizing the solenoid coil 68 on the force transmitting member 69.

Figure 11:
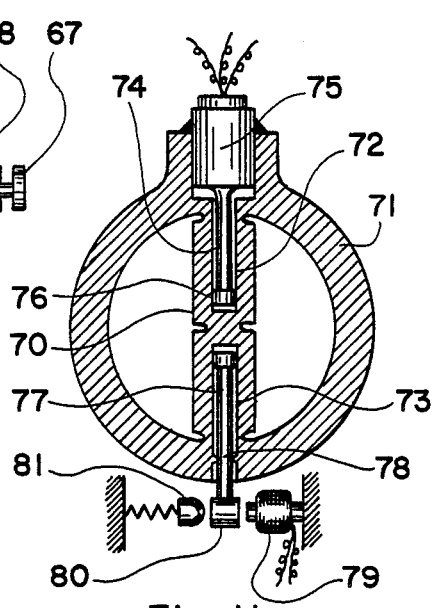
FIG. 11 illustrates a cross section of yet a further embodiment of the vortex flowmeter comprising a vortex generator-sensor.

In FIG. 11 there is illustrated a cross section of yet a further embodiment of the vortex flowmeter comprising a vortex generator-sensor. The bluff body 70 secured to the flowmeter body 71 at both extremities thereof includes two blind holes 72 and 73 respectively extending from the two extremities thereof towards the midsection thereof. The blind hole 72 is engaged by the elongated force transmitting member 74 extending from the transducer 75, which is anchored to the bluff body 70 at the extremity 76 thereof in a fixed relationship. The blind hole 73 is engaged by a rod 77 that is simply supported at a midsection 78 thereof. An electromagnet 79 attracting a ferromagnetic extremity 80 of the rod 77, or a spring actuated mass 81 impacting on a rigid target 80 exerts a mechanical impulse on the bluff body 70, which action generates information on the calibration of the amplitude ratio.

Figure 12:
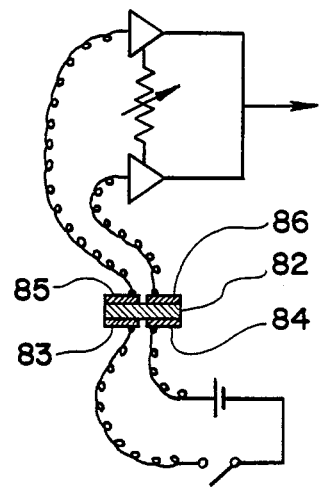
FIG. 12 illustrates an embodiment of the electric circuit that imposes an electric pulse on the Piezo electric element for calibration purposes.

In FIG. 12 there is illustrated an embodiment of the electronic circuit that is employed to calibrate the same Piezo electric element 82 as the element 20 included in the embodiment shown in FIG. 5. When the two electrodes 83 and 84 are switched off from the grounding terminal and switched on to two oppositely charged electric terminals, the two electrodes 85 and 86 supply electromotive forces to the amplifiers respectively connected thereto. The ratio of the output electromotive force supplied by the electrodes 85 and 86 to the electromotive force supplied to the electrodes 83 and 84 provides a calibration standard by which the amplitude of the alternating fluid dynamic force is determined from the amplitude of the alternating electrical signal generated by the vortex shedding. The same method of calibrating Piezo electric element 82 can be used to calibrate the Piezo electric elements shown in FIGS. 6 and 7, when the input electromotive force is imposed across the two grounded electrodes after switching off from the grounding terminal.

Figure 13:
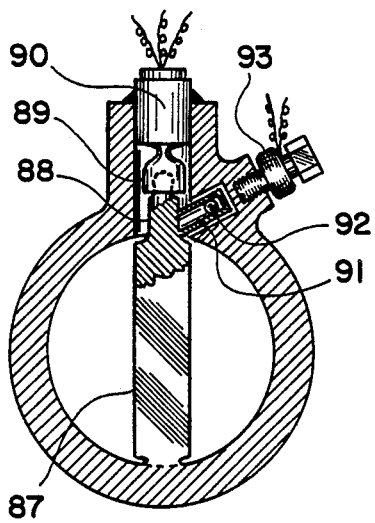
FIG. 13 illustrates a cross section of still another embodiment of the vortex flowmeter comprising a vortex generator-sensor.

In FIG. 13 there is illustrated a cross section of still another embodiment of the vortex flowmeter comprising a vortex generator-sensor. The bluff body 87 secured to the flowmeter body at one extremity thereof includes an extension 88 extending from the other extremity and connected to the force transmitting member 89 of the transducer 90, which extension includes a cylindrical cavity 91 disposed in a nonhorizontal position, which houses a free rolling ball 92 attracted to the electromagnet 93. When the electromagnet 93 is deenergized, the ball 92 rolls down and impacts on the extension 88 of the bluff body, which action exerts a mechanical impulse of known magnitude predetermined by the weight of the ball 92 on the bluff body 87.

Figure 14:
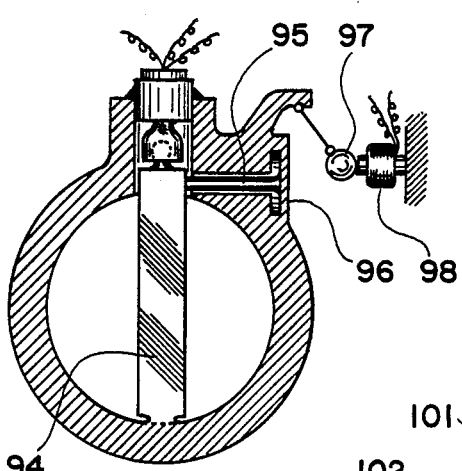
FIG. 14 illustrates a cross section of still a further embodiment of the vortex flowmeter comprising a vortex generator-sensor.

In FIG. 14 there is illustrated a cross section of still a further embodiment of the vortex flowmeter comprising a vortex gengrator-sensor. The bluff body 94 includes an elongated member 95 extending laterally therefrom and anchored to a flange 96. A pendulous mass 97 attracted to the electromagnet 98 swings towards the flange 96 when the electromagnet 98 is deenergized and impacts on the flange 96, which action delivers a mechanical impulse of known magnitude on the bluff body 94.

Figure 15:
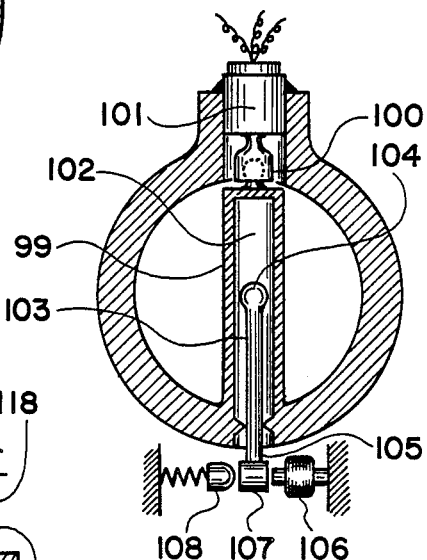
FIG. 15 illustrates a cross section of yet still another embodiment of the vortex flowmeter comprising a vortex generator-sensor.

In FIG. 15 there is illustrated a cross section of yet still another embodiment of the vortex flowmeter comprising a vortex sensor-generator. The bluff body 99 with one extremity secured to the flowmeter body and the other extremity connected to the force transmitting member 100 of the transducer 101 includes an axial hole 102 extending through the secured extremity thereof and out of the flowmeter body. An elongated lever 103 extends into the hole 102 in a clearance relationship, which elongated lever 103 is simply supported at a section intermediate one extremity 104 disposed within the hole 102 and the other extremity 105 extending out of the hole 102. An electromagnet 106 attracting a ferromagnetic target 107 affixed to the extremity 105 of the lever 103 or a spring actuated mass 108 impacting on the rigid target 107 exerts a mechanical impulse of known magnitude on the bluff body for calibration purposes.

Figure 16:
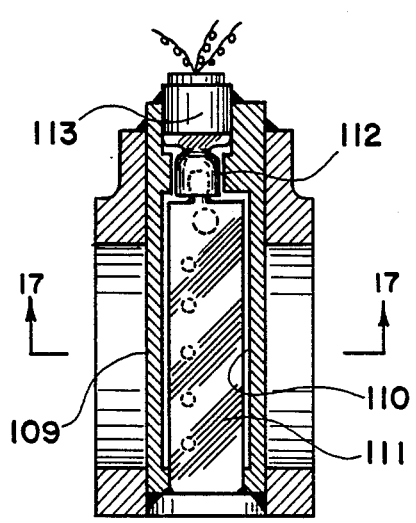
FIG. 16 illustrates a cross section of yet still a further embodiment of the vortex flowmeter comprising a vortex generator-sensor.

In FIG. 16 there is illustrated a cross section of yet still a further embodiment of the vortex flowmeter comprising a vortex generator-sensor. The bouff body 109 rigidly secured to the flowmeter body includes a planar cavity 110 disposed on a plane parallel to the direction of the fluid flow, which planar cavity contains a pressure sensing planar member 111 in a clearance relationship. The planar member 111 is secured to the bluff body at one extremity and connected to the force transmitting member 112 of the transducer 113 at the other extremity by a mechanical coupling. The two side walls of the planar cavity 110 respectively include two sets of holes open to the two lateral sides of the bluff body 109.

Figure 17:
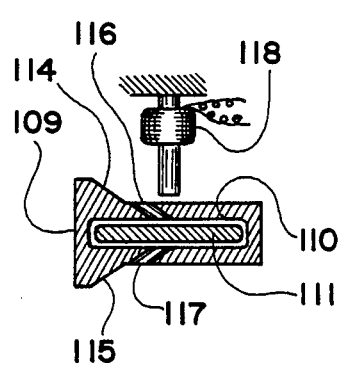
FIG. 17 illustrates another cross section of the embodiment shown in FIG. 16.

In FIG. 17 there is illustrated another cross section of the vortex generator-sensor included in the embodiment shown in FIG. 16. The two opposite sides of the pressure sensing planar member 111 are respectively exposed to the alternatively fluctuating fluid pressures at the two lateral sides 114 and 115 of the bluff body 109, because of the two sets of holes 116 and 117 respectively disposed through the two side walls of the planar cavity 110. The electromagnet 118 of the calibration device exerts a mechanical impulse of known magnitude on the planar member 111 for calibration purpose. It is preferred that the bluff body 109 is made of a nonmagnetic material, while the planar member 111 is made of a ferromagnetic material in this particular illustrated embodiment. It is readily recognized that one of the calibration devices shown in FIGS. 9, 10, 13, 14 and 15 can be incorporated into the embodiment shown in FIG. 16. It should be mentioned that the vortex generator-sensor shown in FIGS. 16 and 17 can exist itself without structurally relying on the flowmeter body, while the vortex generator-sensor shown in FIGS. 1, 8, etc. can not exist without relying on the flowmeter body. Therefore, the vortex generator-sensor shown in FIGS. 16 and 17 can be constructed to an insertion type flowmeter such as those illustrated in FIG. 18 and 20. The vortex flowmeter shown in FIGS. 16 and 17 operates on the same principles as those of the vortex meter shown in FIGS. 1 and 2.

Figure 18:
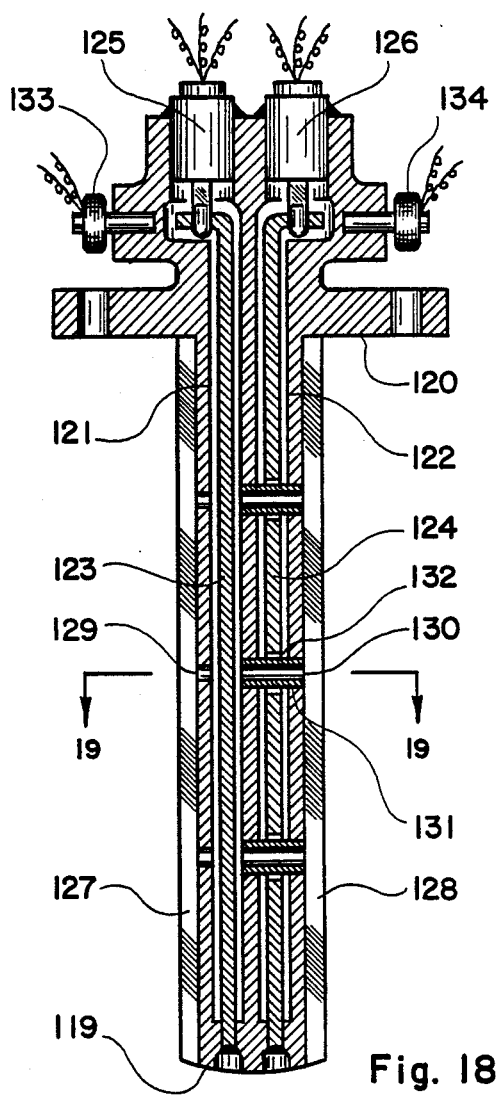
FIG. 18 illustrates a cross section of an embodiment of the insertion type vortex flowmeter comprising a vortex generator-sensor.

In FIG. 18 there is illustrated a cross section of an embodiment of the insertion type vortex flowmeter comprising a vortex generator-sensor. The bluff body 119 extending from an anchoring flange 120 includes a pair of planar cavities 121 and 122 disposed on a plane parallel to the direction of fluid flow. The two planar cavities 121 and 122 respectively contain two pressure sensing planar members 123 and 124 in a clearance relationship. The first extremities of the planar members 123 and 124 are secured to the bluff body structure, while the second extremities thereof are respectively connected to the transducers 125 and 126. The two opposite sides of the planar member 123 are respectively exposed to the alternatively fluctuating fluid pressures at the two lateral sides 127 and 138 of the bluff body 119, because of the two sets of the holes 129 and 130 respectively disposed through the two side walls of the planar cavity 121 and open to the two lateral sides 127 and 128 of the bluff body 119. The holes 13 are provided by the short tubings disposed across the planar cavity 122 and extending through the clearance holes 132 included in the planar member 124. The planar cavity 122 is sealed off from the space occupied by the fluid. The calibration devices 133 and 134 respectively exert mechanical impulse of known magnitude on the two combinations of the planar member and the force transmitting member connected to the transducers 125 and 126 respectively.

Figure 19:
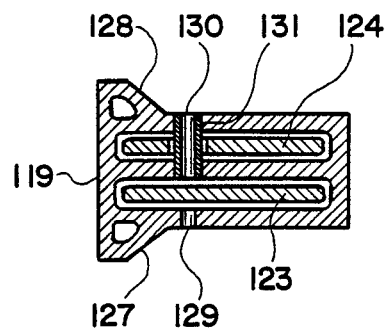
FIG. 19 illustrates another cross section of the embodiment shown in FIG. 18.

In FIG. 19 there is illustrated another cross section of the vortex generator-sensor shown in FIG. 18, which cross section is taken along plane 19—19 as shown in FIG. 18. The transducer 125 connected to the planar member 123 exposed to the fluctuating fluid pressures picks up alternating fluid dynamic force generated by the vortices shed from the two lateral sides 127 and 128 of the bluff body 119 and experienced by the planar member 123 plus the mechanical vibration noise. The transducer 126 connected to the planar member 124 isolated within the sealed off planar cavity 122 picks up the mechanical vibration noise only. The two electrical signals respectively generated by the two transducers 125 and 126 are combined in such a way that the mechanical vibration noise is cancelled therebetween and refined signals representing the vortex shedding is obtained. The insertion vortex flowmeter shown in FIGS. 18 and 19 operates on the same principles as those of the vortex flowmeter shown in FIGS. 1 and 2.

Figure 20:
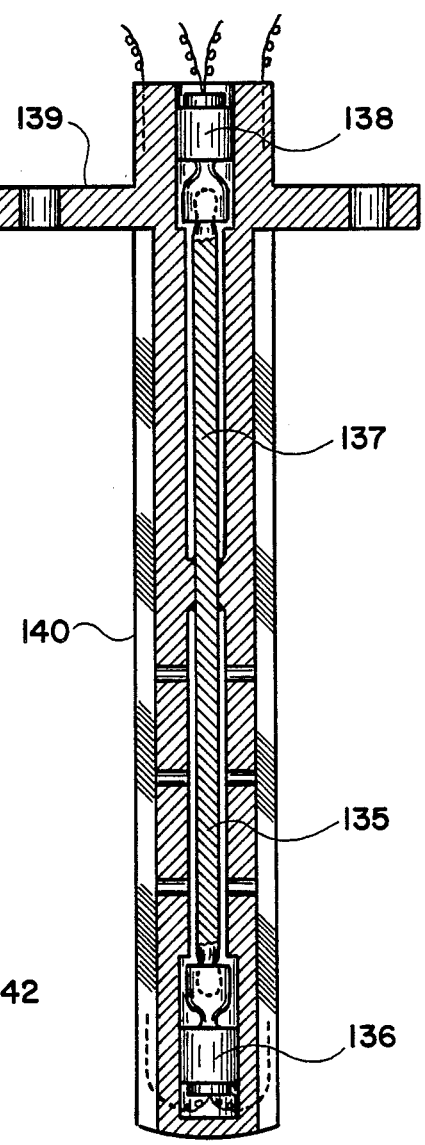
FIG. 20 illustrates a cross section of another embodiment of the insertion type vortex flowmeter comprising a vortex generator-sensor.

In FIG. 20 there is illustrated a cross section of another embodiment of the insertion type vortex flowmeter having a construction similar to and operating on the same principles as the embodiment shown in FIGS. 18 and 19. In this arrangement, the pair of the combinations of the planar member and the transducer 135 and 136 exposed to the fluctuating fluid pressure, and 137 and 138 isolated from the fluctuating fluid pressure are disposed in a series arrangement instead of the side by side arrangement employed in the embodiment shown in FIGS. 18 and 19. The anchoring flange 139 may be disposed at a midsection of the bluff body 140 intermediate the two planar members 135 and 137.

Figure 21:
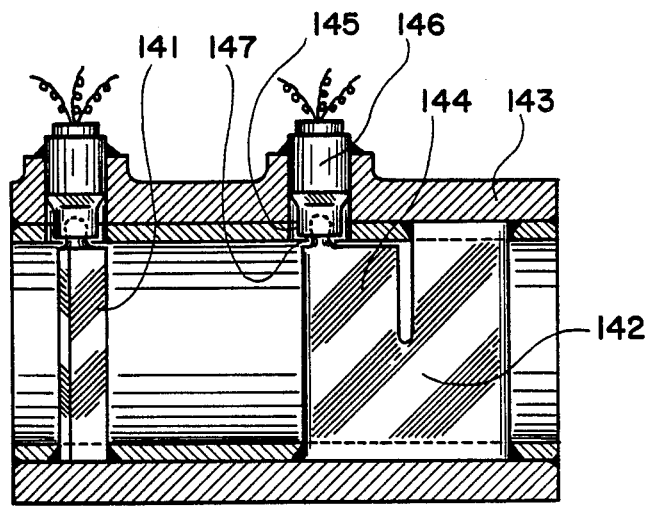
FIG. 21 illustrates a cross section of an embodiment of the vortex flowmeter comprising a vortex generator-sensor and a vortex sensing planar member disposed downstream of the vortex generator-sensor.

In FIG. 21 there is illustrated a cross section of the vortex flowmeter comprising a vortex generator-sensor having the same construction and operating on the same principles as the embodiment shown in FIGS. 1 and 2, and a vortex sensing planar member 142 with at least one extremity secured to the flowmeter body 143 and a deflective portion 144 thereof connected to the force transmitting member 145 extending from the transducer 146 by a mechanical coupling 147. The volume and/or mass flow rate of the fluid can be determined from one of the two electrical signals respectively generated by the two transducers included in this embodiment on the same principles as those described in conjunction with the embodiment shown in FIGS. 1 and 2. On the other hand, the velocity of the fluid flow can be determined from the time of travel between the two vortex sensors, which information is provided by the combination of two transducers. The method of determining the fluid velocity from the time of travel is particularly useful in measuring very low fluid velocities The vortex generator-sensor of the present invention may use a Piezo electric transducer, or other types of the transducer such as a capacitive or inductive or strain gauge transducers, which versions of the transducers are well known to those skilled in the art of measurement technology and, accordingly, the present inventions are not limited to any particular transducers employed therein.

While the principles of the present invention have now been made clear by the illustrative embodiments, there will be immediately obvious to those skilled in the art many modifications and equivalents in the structures, arrangements, proportions, elements and materials which are particularly adapted to the specific working environments and operating conditions in the practice of the invention without departing from those principles. It is not desired to limit the invention to the particular illustrated embodiments shown and described and, accordingly, all suitable modifications and equivalents may be resorted to falling within the scope of the inventions as defined by the claims which follow.

I claim:

1. A method for determining rate of fluid flow comprising procedures for:
   (a) generating vortices by partially obstructing a flow passage with an elongated cylindrical member disposed thereacross;
   (b) detecting frequency and amplitude of fluctuating electrical signal generated by a transducer connected to a deflective portion of the elongated cylindrical member generating vortices and experiencing a fluctuating fluid dynamic force created by the vortices;
   (c) determining velocity of the fluid flow from the frequency of the fluctuating electrical signal representing the fluctuating fluid dynamic force created by the vortices and experienced by the deflective portion of the elongated cylindrical member;
   (d) determining amplitude of the fluctuating fluid dynamic force/experienced by the deflective portion of the elongated/cylindrical member from the amplitude of the fluctuating electrical signal by using a conversion relationship calibrated by using a ratio of amplitude of a mechanical impulse of known magnitude exerted on the combination of the deflective portion of the elongated cylindrical member and the transducer to amplitude of an electrical signal generated by the transducer as a result of the mechanical impulse of known magnitude; and
   (e) determining mass flow rate of the fluid from a combination of the velocity of the fluid flow determined from the frequency of the fluctuating electrical signal and the amplitude of the fluctuating fluid dynamic force determined from the amplitude of the fluctuating electrical signal.

2. The method as set forth in claim 1 wherein density of the fluid is determined as a ratio of the mass flow rate to the velocity of the fluid flow.

3. The method as set forth in claim 1 wherein the mechanical impulse of known magnitude is generated by momentum of a mass generated by Earth's gravitational pull and impacting on the combination of the deflective portion of the elongated cylindrical member and the transducer.

4. The method as set forth in claim 1 wherein the mechanical impulse of known magnitude is generated by momentum of a mass generated by a spring force launching the mass and impacting on the combination of the deflective portion of the elongated cylindrical member and the transducer.

5. The method as set forth in claim 1 wherein the mechanical impulse of known magnitude is generated by an electromagnetic force momentarily acting on the combination of the deflective portion of the elongated cylindrical member and the transducer.

6. The method as set forth in claim 1 wherein the mechanical impulse of known magnitude is generated by an electrical pulse of known magnitude imposed across a first pair of electrodes included in a Piezo electric element contained in the transducer, wherein the first pair of electrodes are respectively disposed on two opposite sides of a plane including a longitudinal axis of the elongated cylindrical member and generally parallel to direction of the fluid flow, and the fluctuating electrical signal is supplied by at least one of a second pair of electrodes included in the Piezo electric element and respectively disposed on the two opposite sides of said plane.

7. An apparatus for measuring fluid flow comprising in combination:
   (a) a body including a flow passage;
   (b) a vortex generator of an elongated cylindrical shape disposed across the flow passage, wherein at least one extremity of the vortex generator is secured to said body at least in part; and
   (c) a transducer means including a force transmitting member connected to a deflective portion of said vortex generator by a mechanical coupling, wherein said force transmitting member transmits a minute bending deflection of the vortex generator about an axis generally parallel to the central axis of the flow passage to a transducer element included in the transducer means;

wherein a fluctuating fluid dynamic force created by the vortices and experienced by the vortex generator generates a fluctuating electrical signal from the transducer means as a measure of the fluid flow through the flow passage.

8. The combination as set forth in claim 7 wherein velocity of the fluid is determined from frequency of the fluctuating electrical signal.

9. The combination as set forth in claim 8 wherein mass flow rate of the fluid is determined from a combination of the velocity of the fluid and amplitude of the fluctuating electrical signal.

10. The combination as set forth in claim 9 wherein density of the fluid is determined as a ratio of the mass flow rate to the velocity of the fluid.

11. The combination as set forth in claim 9 wherein said combination includes means for exerting a mechanical impulse of known magnitude to the combination of the vortex generator and the transducer means, and means for measuring amplitude of an electrical pulse generated by the transducer means as a result of the mechanical impulse of known amplitude, wherein the ratio of the magnitude of said mechanical impulse to the amplitude of said electrical pulse generated by said mechanical impulse is used as a calibration standard in determining amplitude of the fluctuating fluid dynamic force from the amplitude of the fluctuating electrical signal.

12. The combination as set forth in claim 11 wherein said mechanical impulse of known magnitude is generated by momentum of a mass generated by Earth's gravitational pull and impacting on the combination of the vortex generator and the transducer means.

13. The combination as set forth in claim 11 wherein said mechanical impulse of known magnitude is generated by momentum of a mass generated by a spring force launching the mass and impacting on the combination of the vortex generator and the transducer means.

14. The combination as set forth in claim 11 wherein said mechanical impulse of known magnitude is generated by an electromagnetic force momentarily acting on the combination of the vortex sensor and the transducer means.

15. The combination as set forth in claim 11 wherein said mechanical impulse of known magnitude is generated by an electrical pulse of known magnitude imposed across a first pair of electrodes inlcuded in a Piezo electric element contained in the transducer means, wherein the first pair of electrodes are respectively disposed on two opposite sides of a plane including a longitudinal axis of the vortex sensor and generally parallel to the central axis of the flow passage, and the fluctuating electrical signal is supplied by at least one of a second pair of electrodes included in the Piezo electric element and respectively disposed on the two opposite sides of said plane.

16. An apparatus for measuring fluid flow comprising in combination:
   (a) a body including a flow passage;
   (b) a vortex generator of an elongated cylindrical shape disposed across the flow passage and secured to the body, said vortex generator including a planar cavity disposed on a plane generally parallel to the central axis of the vortex generator and the central axis of the flow passage, wherein two side walls of the planar cavity respectively include at least one opening open to one of the two opposite cylindrical sides of the vortex generator;
   (c) a planar member disposed within the planar cavity in an isolated arrangement from walls of the planar cavity, wherein at least one extremity of the planar member is secured to a wall of the planar cavity; and
   (d) a transducer means including a force transmitting member connected to a deflective portion of the planar member, wherein said force transmitting member transmits a minute bending deflection of the planar member about an axis parallel to the central axis of the flow passage to a transducer element included in the transducer means;
wherein fluctuating fluid pressure at the two opposite cylindrical sides of the vortex generator created by vortices generates a fluctuating electrical signal from the transducer means as a measure of the fluid flow through the flow passage.

17. The combination as set forth in claim 16 wherein velocity of the fluid is determined from frequency of the fluctuating electrical signal.

18. The combination as set forth in claim 17 wherein mass flow rate of the fluid is determined from a combination of the velocity of the fluid and amplitude of the fluctuating electrical signal.

19. The combination as set forth in claim 18 wherein density of the fluid is determined as ratio of the mass flow rate to the velocity of the fluid.

20. The combination as set forth in claim 18 wherein said combination includes means for exerting a mechanical impulse of known magnitude to the combination of the planar member and the transducer means, and means for measuring amplitude of an electrical pulse generated by the transducer means as a result of the mechanical impulse of known magnitude, wherein the ratio of magnitude of said mechanical impulse to the amplitude of electrical pulse is used as a calibration standard in determining amplitude of the fluctuating fluid dynamic force from the amplitude of the fluctuating electrical signal.

21. The combination as set forth in claim 20 wherein said mechanical impulse of known magnitude is generated by momentum of a mass generated by Earth's gravitational pull and impacting on the combination of the planar member and the transducer means.

22. The combination as set forth in claim 20 wherein said mechanical impulse of known magnitude is generated by momentum of a mass generated by a spring force launching the mass and impacting on the combination of the planar member and the transducer means.

23. The combination as set forth in claim 20 wherein said mechanical impulse of known magnitude is generated by an electromagnetic force momentarily acting on the combination of the planar member and the transducer means.

24. The combination as set forth in claim 20 wherein said mechanical impulse of known magnitude is generated by an electrical pulse of known magnitude imposed across a first pair of electrodes included in a Piezo electric element contained in the transducer means, wherein the first pair of electrodes are respectively disposed on two opposite sides of a plane including a longitudinal axis of the vortex sensor and generally parallel to the central axis of the flow passage, and the fluctuating electrical signal is supplied by at least one of a second pair of electrodes included in the Piezo electric element and respectively disposed on the two opposite sides of said plane.

25. The combination as set forth in claim 16 wherein the vortex sensor includes another planar cavity sealed off from the fluid surrounding the vortex sensor; another planar member disposed in said another planar cavity in an isolated arrangement from walls of said another planar cavity, wherein at least one extremity of said another planar member is secured to one wall of said another planar cavity; and another transducer means including a force transmitting member connected to a deflective portion of said another planar member; wherein two fluctuating electrical signals respectively generated by said a planar member and said another planar member are combined to cancel noises created by structural vibrations of the apparatus therebetween and obtain a refined signal representing vortex shedding from the vortex sensor.

* * * * *